166-308

United States Patent Office 3,477,512
Patented Nov. 11, 1969

3,477,512
OIL WELL FRACTURING METHOD USING WAX EMULSIONS
Frederick Herman Siegele, Westport, Conn., assignor to American Cyanamid Company, Stamford, Conn., a corporation of Maine
No Drawing. Filed Dec. 15, 1967, Ser. No. 690,748
Int. Cl. E21b 43/26
U.S. Cl. 166—283                    3 Claims

ABSTRACT OF THE DISCLOSURE

A novel wax emulsion is disclosed for sealing against fluid loss including acid losses which may be incurred when in fracturing operations acid is employed to etch carbonate formations. The emulsion comprises a microcrystalline wax having one or more natural gum colloids to impart emulsion stability and fungicidal and/or bactericidal preservatives with tetrapotassium pyrophosphate added to the emulsion for freeze-thaw stability. In particular, the tetrapotassium pyrophosphate provides emulsion stability through (at least one of) freeze-thaw cycle. The method of making the wax emulsion comprises the mixing of the wax emulsion constituents at a temperature sufficient to melt the wax component and then passing the emulsion through a homogenizing valve at low pressure, whereby the average particle size of the wax is maintained relatively large. The method of employing the emulsion in fracturing operations comprises the pumping of the dilute emulsion into an oil well while it is being fractured, thereby sealing the porous surface of the formation as it is created as a consequence of applying hydraulic pressure to the oil bearing formations. As mentioned above, the emulsions may also be usefully employed in the acid used to etch carbonate formations. After fracturing and propping and/or acid treatment of the fractured formations, the wax emulsion of the invention is dissolved by the hydrocarbons that are produced when the well is put into production.

Background of the invention

This invention relates to a method and composition for use in the fracturing of oil wells, and more particularly to the method of preparing and using a wax emulsion to temporarily plug the porous walls of an oil well against fluid loss during fracturing and acidizing operations and to the wax emulsion composition therefor.

The fracturing of oil wells has been known for some time and generally comprises the breaking of oil-containing formations adjacent the well bore by hydraulic pressure to increase the permeability of said formations to the flow of crude oil. The fracturing is accomplished by hydraulic pressure through the well bore and the fissures and crevices in the fractured well are then propped open by hard particulate material such as sand, ground shells, or synthetic materials. These propping materials are mixed into the fracturing fluid. Acid may be included in the fracturing fluid to increase the producing surface area by enlargement of the fissures formed by the pressure fracturing when the formation can advantageously be etched by acids such as hydrochloric and mixtures thereof. After the fracturing or acidizing procedure, the pressure on the fluid is reduced and formation fluids flow through the nearly created drainage area to the well bore.

Some of the problems in fracturing and acidizing oil wells have concerned the maintaining of hydraulic pressure at the formation face and the excessive loss of fracturing or acidizing fluid through the porous well sidewalls. These problems manifest themselves in that the drainage area thus created is not sufficiently large.

The use of a wax emulsion to prevent fluid loss or seepage through soil has been known as disclosed in U.S. Patent No. 3,108,441, wherein the percolation of water through sand is prevented by the formation of a sub-surface wax membrane. Such prior art wax emulsions, however, had a small proportion of large (i.e., 3 to 10 micron) particle sizes for the wax in the emulsion. In the above-identified patent, for example, it is preferred that the wax particle size be from 0.1 to 2.5 microns. Further, the emulsion stability of such wax emulsions has not been satisfactory particularly with respect to freeze-thaw stability. After a single freeze-thaw cycle the stability of such emulsions was destroyed.

Accordingly, representative objects of the present invention are to provide a stable wax emulsion concentrate that may be diluted at a well site for the sealing of the formation fracture surfaces during oil well fracturing and acidizing operations and to the method of fracturing and acidizing with such emulsions.

Other objects of the invention will in part be obvious and will in part appear hereinafter.

The invention accordingly comprises a composition of matter possessing the characteristics, properties, and the relation of constituents which will be exemplified in the composition hereinafter described, and the method of use of such compositions, and the scope of the invention will be indicated in the claims.

Summary of the invention

I have found that for the fracturing and acidizing of oil-bearing formation by hydraulic pressure and/or acid treatment, that fluid loss to the fractured formation can be minimized by the use of a large particle wax emulsion for temporarily plugging the porous sand and/or rock forming the walls of the formation. At least 30% and preferably 50% of the wax particles of the emulsion should have a particle size of from 3 to 10 microns. It has been found that such relatively large particles may be formed by passing an aqueous mixture of dispersing agent, wax and emulsion stabilizer with preservative through a homogenizing valve at relatively low pressure. Further, I have found that the addition of a small amount of tetrapotassium pyrophosphate to the wax emulsion provides greatly improved emulsion stability, particularly with respect to its freeze-thaw characteristics.

Description of the preferred embodiment

The wax emulsion is prepared by combining 40% by weight of microcrystalline wax having a melting point of over 160° F. with an aqueous mixture of anionic dispersing agent containing from 0.5 to 5% by weight sodium naphthalene sulfonate condensate with formaldehyde (Lomar-D or Tamol-N). Also in the aqueous solution there is from 0.5 to 2.5% by weight of a natural gum such as gum ghatti, gum arabic, or gum shiraz for colloidal stability of the emulsion. A small amount of preservative, i.e., fungicidal and bactericidal such as those sold under the trademarks "Dowicide 7," "Dowicide G," or "Santobrite" in the amount of from 0.1% to 0.5% by weight is also preferably included in the aqueous mixture. The wax is then added to the aqueous mixture and the temperature of the mixture raised to a temperature exceeding the melting point of the wax. The mixture is then agitated to achieve adequate mixing and is then passed through a homogenizer valve or a two-stage homogenizer at a total pressure necessary to achieve the desired particle size.

For example, a Manton-Gaulin Laboratory homogenizer was used to produce an emulsion of the desired particle size range. The first stage of the homogenizer reduced the pressure from 1000 p.s.i. to 500 p.s.i. and the second stage reduced the pressure to atmospheric pressure.

When the emulsion has cooled to a temperature below the melting point of the wax, from 2 to 5 parts by weight of anhydrous potassium tetrapotassium pyrophosphate is added to 95 parts by weight of the emulsion. The pyrophosphate is added gradually to the emulsion which is stirred throughout this addition with a low speed agitator. A build up of the tetrapotassium pyrophosphate at the bottom of the tank should be avoided since it has been found that this condition favors coagulation of emulsion. After about 30 minutes of stirring, the tetrapotassium pyrophosphate is completely in solution and the wax emulsion is filtered and ready for use.

The amount of wax in the emulsion concentrate is maintained as high as possible, the emulsion being used in dilute solution at the oil well site. The concentration of wax, however, is limited by emulsion stability and accordingly, the wax will constitute from 25 to 50% by weight of the emulsion. The microcrystalline wax preferably should have a melting point higher than the temperature at the bottom of the well hole. Waxes having a melting point of 160° F. and higher are preferable. The particle diameter of the wax in the emulsion should range from 1 to 15 microns with a volume-average particle diameter of around 4 to 8 microns, and with at least 30% of the particles being in the range from 3 to 10 microns and preferably over 50% of the particles averaging from 3 to 10 microns in size.

A typical emulsion make in accordance with the invention may have a particle size distribution as shown in Table I.

TABLE I

| Diameter range (microns): | Number fraction of particles in range |
|---|---|
| 0–3 | .654 |
| 3.5–5 | .163 |
| 5.5–10 | .160 |
| Over 10 | .022 |

The particle size in Table I above was obtained by actual count on a photo-micrograph of an emulsion droplet.

The volume-average particle diameter of the wax in the emulsion of Table I has been calculated as follows. The number average particles size of the emulsion is 3.2 microns and considering the distribution by volume (or weight) of the formula:

$$\overline{D}_p = \sqrt[3]{\frac{\sum Ni(\overline{D}_{vi})^3}{Ni}}$$

provides a volume-average particle size of 4.8 microns. Thus the volume-average particle size differs from the number average particle size because the diameter enters into the calculation to the third power.

The following comparison tests were on fluid loss for two wax emulsions, one having relatively small particle size and the other having particle size in accordance with the invention. The wax emulsions were compared by placing 350 ml. of 1% wax emulsion of each type in a Fann filter press having three sheets of filter paper. The fluid loss after 10 seconds (spurt) was measured and the fluid loss after 30 minutes was measured.

TABLE II

| | 10 Second Fluid Loss (spurt), ml. | 30 Minute Fluid Loss, ml. |
|---|---|---|
| 1% emulsion 0.5 to 1.0μ volume-average particle size | 32 | 64.5 |
| 1% emulsion 4.8μ volume-average particle size | 0 | 32 |

As shown in Table II above, the wax emulsion having a particle size of from 0.5 to 1.0 micron exhibited a much greater fluid loss than did the emulsion of the invention. In particular, it should be noted that there was no 10 second fluid loss (spurt) with the emulsion of the invention. This is particularly significant in fracturing operations because such operations are of relatively short duration. Thus, emulsions made and used in accordance with the invention greatly reduce fluid loss in fractured or acidized oil well formations in the critically short period of time during which fracturing or acidizing takes place.

The addition of tetrapotassium pyrophosphate to the wax emulsion improves the dispersibility of the emulsion and substantially improves the freeze-thaw stability of the emulsion concentrate. It has been found that wax emulsions containing 5% by weight tetrapotassium pyrophosphate are able to withstand several freeze-thaw cycles without affecting emulsion stability. Emulsions containing 2% tetrapotassium pyrophosphate were found to be stable for one freeze-thaw cycle. It was also found that emulsions containing 0.5% tetrapotassium pyrophosphate were not stable, nor were emulsions containing 2% or less of tetrasodium pyrophosphate.

In the stimulation of oil well production by fracturing, the wax emulsion of the invention is employed as follows. The wax emulsion is pumped into the oil-bearing formation dispersed in the hydraulic fracturing fluid. This mixture is used to form cracks and fissures in these oil bearing formations to stimulate oil production. The fracturing fluid may contain acid for increasing the production surface area of the fractures. In any event, the sealing action of the emulsions diminishes the loss of fracturing fluid to the newly-produced surfaces and results in greater total drainage area per unit volume of fluid used.

The wax of the emulsion is completely soluble in crude oil which results in its being readily dissolved with resultant excellent permeability as contrasted with some prior art polymeric sealers. Thus, after the fracturing and acidizing operations the flow of crude oil from the fractured formations is not in any way impeded by the wax emulsion. Upon reduction of fracturing fluid pressure, crude oil will quickly begin to flow into the bore. When using a wax having melting point of about 160° F., the bottom hole temperature may be as high as about 200° F.

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the genric and specific features of the invention which, as a matter of language, might be said to fall therebetween.

Having described my invention, what I claim as new and desire to secure by Letters Patent is:

1. The method of fracturing an oil well comprising introducing an aqueous wax emulsion into the oil well bore, forcing said emulsion under pressure into the bore of said well to seal the bore against fluid loss, pumping a fracturing fluid under pressure into said well to fracture oil containing formations adjacent to the well bore, propping open said fracture with particulate material mixed with the fracturing fluid, and then withdrawing said fracturing fluid, said aqueous wax emulsion comprising from 25 to 50% by weight of a microcrystalline wax having a volume-average particle diameter of about 4 to 8 microns with at least 30% of the particles being in the range of 3 to 10 microns, said microcrystalline wax having a melting point of at least 160° F., from 0.5 to 2.5% by weight of a natural gum colloid to impart emulsion stability, from 0.5 to 5% by weight of an emulsifying agent, from 0.1 to 0.5% by weight of a preservative and from 2 to 5% by weight of tetrapotassium pyrophosphate and water as a freeze-thaw stabilizer.

2. The method of fracturing an oil well comprising introducing an aqueous wax emulsion into the oil well bore, forcing said emulsion under pressure into the bore of said well to seal the bore against fluid loss, pumping a fracturing fluid under pressure into said well to fracture oil containing formations adjacent to the well bore, propping open said fracture with particulate material mixed with the fracturing fluid and then withdrawing said fracturing fluid, said aqueous wax emulsion comprising a microcrystalline wax having a volume-average particle diameter of about 4 to 8 microns with at least 30% of the particles being in the range of 3 to 10 microns, a natural gum colloid to impart emulsion stability and an emulsifying agent.

3. The method of claim 2 in which the microcrystalline wax has a melting point of at least 160° F. and the emulsion contains tetrapotassium pyrophosphate as a freeze-thaw stabilizer.

References Cited

UNITED STATES PATENTS

| 1,440,356 | 12/1922 | Morrell | 252—311.5 |
| 1,625,672 | 4/1927 | Moreton | 252—311.5 |
| 2,007,218 | 7/1935 | Seltzer | 252—311.5 |
| 3,046,222 | 7/1962 | Phansalker et al. | 166—42 X |
| 3,108,441 | 10/1963 | Watson | 61—36 |
| 3,237,693 | 3/1966 | Huitt et al | 166—42 |
| 3,259,190 | 7/1966 | Parsons | 166—42 |
| 3,266,915 | 8/1966 | Faulkner et al. | 106—207 X |
| 3,302,719 | 2/1967 | Fischer | 166—42 |
| 3,316,965 | 5/1967 | Watanabe | 166—42 X |

STEPHEN J. NOVOSAD, Primary Examiner

U.S. Cl. X.R.

166—308